(12) United States Patent
Chen

(10) Patent No.: US 6,438,725 B2
(45) Date of Patent: *Aug. 20, 2002

(54) APPARATUS AND METHOD FOR FAST CODE COVERAGE ANALYSIS

(75) Inventor: Ding-Kai Chen, San Jose, CA (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,389

(22) Filed: Sep. 15, 1998

(51) Int. Cl.[7] ............................ H02H 3/05; H03M 13/00
(52) U.S. Cl. ............................ 714/759; 714/35; 714/37; 714/52
(58) Field of Search ............................ 714/35, 37, 38, 714/42, 48, 52–54, 759, 760

(56) References Cited

U.S. PATENT DOCUMENTS

| | | | | |
|---|---|---|---|---|
| 5,212,794 A | * | 5/1993 | Pettis et al. | 395/700 |
| 5,694,540 A | * | 12/1997 | Humelsine et al. | 395/183.14 |
| 5,732,210 A | * | 3/1998 | Buzbee | 714/38 |
| 5,758,061 A | * | 5/1998 | Plum | 395/183.11 |
| 5,805,795 A | * | 9/1998 | Whitten | 395/183.14 |

* cited by examiner

Primary Examiner—Peter Wong
Assistant Examiner—Tim Vo

(57) ABSTRACT

Apparatus and method are described for fast code coverage analysis. The present invention for fast code coverage analysis utilizes a technique that provides for capturing an event every first time that a block of code is visited. This allows for generating an event only once during numerous executions of a code block. The generation of only one event provides for an execution time close to the speed of the original source code.

12 Claims, 9 Drawing Sheets

CASE 1 -DIRECT UNCONDITIONAL BRANCH

CASE 2 -DIRECT CONDITIONAL BRANCH

CASE 3 -INDIRECT UNCONDITIONAL BRANCH

CASE 4 -INDIRECT CONDITIONAL BRANCH

FIG. 9A

```
T0    R3<-- R4 + R5
      ...
      JUMP TO [R1] IF R3<0
T1    R9<-- R10 + R11
      ...
T2    R6<-- R7 + R8
      ...
```
132

FIG. 9B

```
S101  R9<-- R10 + R11                    (T1 TRANS)
      ...
S201  R6<-- R7 + R8                      (T2 TRANS)
      ...
```
134

FIG. 9C

```
S101  R9<-- R10 + R11                    (T1 TRANS)
      ...
S201  R6<-- R7 + R8                      (T2 TRANS)
      ...
      ...
S301  R3<-- R4 + R5
      ...
S310  JUMP TO S312  IF R3<0
S311  JUMP TO S315  IF R3>=0
S312  PUSH [R1] ON STACK
S313  B<-NULL                            (T0 TRANS)
S314  JUMP TO HIGH LEVEL CONTROL (84)
S315  PUSH T1 ON STACK
S316  B<-S311
S317  JUMP TO HIGH LEVEL CONTROL (84)
```
136

FIG. 9D

```
S101  R9<-- R10 + R11                    (T1 TRANS)
      ...
S201  R6<-- R7 + R8                      (T2 TRANS)
      ...
      ...
S301  R3<-- R4 + R5
      ...
S310  JUMP TO S312  IF R3<0
S311  JUMP TO S101  IF R3>=0
S312  PUSH [R1] ON STACK
S313  B<-NULL                            (T0 TRANS)
S314  JUMP TO HIGH LEVEL CONTROL (84)
S315  PUSH T1 ON STACK
S316  B<-S311
S317  JUMP TO HIGH LEVEL CONTROL (84)
```
138

APPARATUS AND METHOD FOR FAST CODE COVERAGE ANALYSIS

BACKGROUND OF THE INVENTION

1. Field of the Invention

The present invention generally relates to an apparatus and method for efficient and fast code coverage analysis. Generally, code coverage analysis is a technique that checks which program code blocks have been executed during testing.

2. Description of Related Art

As is known in the computer and software arts, when a software program is developed, it will contain errors. As a consequence, developers of the software program utilize many techniques in which to check the correctness of the program and to diagnose errors. One of the techniques that developers will often use is a benchmark test to check the code coverage of the program. The best benchmark tests check as many different code blocks and combinations as possible (i.e., code coverage).

The result of a code coverage analysis can be processed in many different ways. One is a single percentage number showing the amount of code covered in the test. For a single test run, the one percentage number can be used directly.

Another way is a map of where the covered code is located. For multiple test runs, the percentages cannot be combined by adding the results as there will be a large amount of duplicated coverage. In multiple test run cases, a map of the code blocks hit must be kept for the first run case and updates must be made to the map when new test results are combined. The percentage can then be computed after obtaining cumulated results in the map.

One of the methods to check if all the code in the program has been tested (i.e., code coverage) is to utilize the inclusion of a display message indicating when each block of code is entered, thereby enabling the developer to test which blocks of code have been entered and tested. The greatest problem with the inclusion of display messages in the first line of each block of code is the developer's time to include a display statement at the beginning of each block of code, and the time to actually execute the modified program. These extra instructions slow down the execution a lot due to input/output (I/O) operations and plainly due to more instructions having to be executed. A further overhead factor is that each program must be recompiled or reassembled and linked with the additional display commands. Furthermore, another problem with this method is the additional paper resource that is required to trace where the execution of the program is currently situated.

Another method of code coverage analysis, similar to the displaying of a message at the beginning of each block in the software program, is to include instead a write to file a statement in the beginning of each code block. The output file shows each portion of the software program entered Problems with this write to file method, again as stated above for the display technique, include the extended program execution time, the developer's time to include a write to file statement at the beginning of each block of code, and the time required to recompile, reassemble, and execute a link program. Also, the amount of disk storage required for such write to file could be an enormous resource demand.

Heretofore, software developers have lacked an apparatus and method for accomplishing code coverage analysis in an efficient way.

SUMMARY OF THE INVENTION

Certain objects, advantages and novel features of the invention will be set forth in part in the description that follows and in part will become apparent to those skilled in the art upon examination of the following description or may be learned with the practice of the invention. The objects, features and advantages of the invention may be realized and obtained by means of the instrumentalities and combinations particularly recited in the appended claims.

To achieve the advantages and novel features, the present invention is generally directed to an apparatus and method for fast and efficient code coverage analysis. The present invention for fast code coverage analysis utilizes a technique that provides for capturing an event whenever a block of code is visited for the first time. This allows for generating an event only once during numerous executions of a code block. The generation of only one event will provide for execution time close to the speed of the original source code. The speed of the code coverage analysis execution is now provided in an efficient way.

The present invention further utilizes an apparatus and method where each time a branch is executed, a high level control looks up the branch target program counter in the code cache in order to see if there is a code block corresponding to the branch target program counter. If the program block is found within the code cache, then the high level control determines if that code block has already been executed and proceeds with further execution of the copied source code in code cache.

If the high level control does not find the code within the code cache, then the high level control determines that this is the first time that code block has been executed in the original source program and copies that code block from the original source program into the code cache and provides notification of the first execution of the block of code. This allows a developer to calculate the amount of lines executed in the test run of the program as compared to the total amount of code lines in the original source code.

BRIEF DESCRIPTION OF THE DRAWINGS

The accompanying drawings incorporated in and forming a part of the specification illustrate several aspects of the present invention, and together with the description, serve to explain the principles of the invention. In the drawings:

FIG. 9A is the original source code for an example of an indirect conditional branch.

FIG. 9B is a block diagram showing the contents of the code cache when part of the original source code has been translated for the example of an indirect conditional branch as shown in FIG. 9A.

FIG. 9C shows the translated original source code within the code cache prior to a branch statement being backpatched for the example of an indirect conditional branch as shown in FIG. 9A.

FIG. 9D is a block diagram of the original source code within the code cache after a branch statement is backpatched for the example of an indirect conditional branch as shown in FIG. 9A.

DETAILED DESCRIPTION OF THE PREFERRED EMBODIMENT

Figure 1:
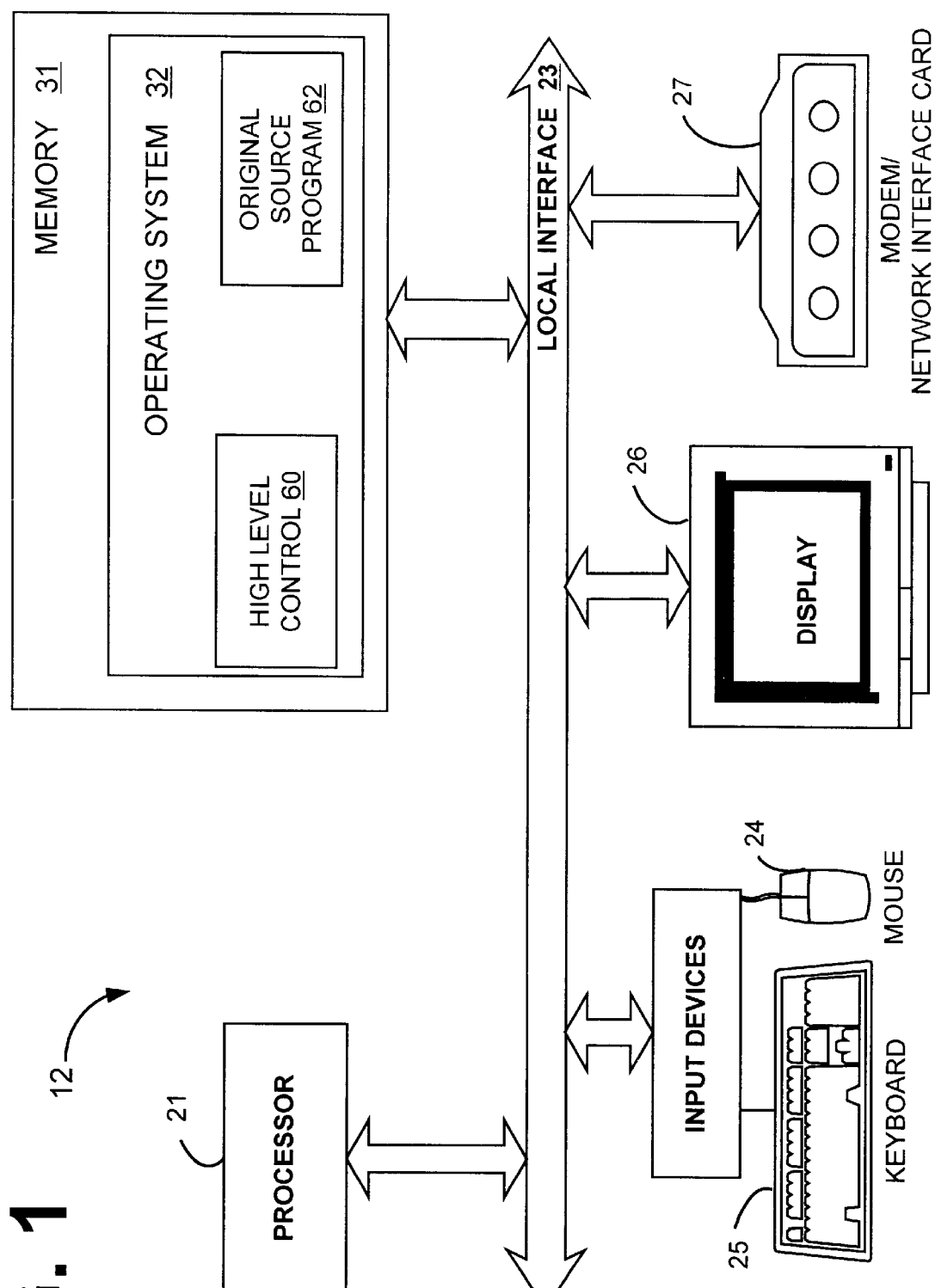
FIG. 1 is a block diagram of a user system showing the high level control of the present invention and original source program within the memory area.

Reference will now be made in detail to the description of the invention as illustrated in the drawings. Although the invention will be described in connection with these drawings, there is no intent to limit it to the embodiment or embodiments disclosed therein. On the contrary, the intent is to include all alternatives, modifications, and equivalents included within the spirit and scope of the invention as defined by the appended claims.

As illustrated in FIG. 1, computer systems 12 today generally comprise a processor 21, and memory 31 (e.g., RAM, ROM, hard disk, CD-ROM, etc.) with an operating system 32. The processor 21 accepts program code 62 and data from the memory 31 over the local interface 23, for example, a bus(es). Direction from the user can be signaled by using input devices, for example, a mouse 24 and a keyboard 25. The actions input and result output are displayed on the display terminal 26.

Figure 2:
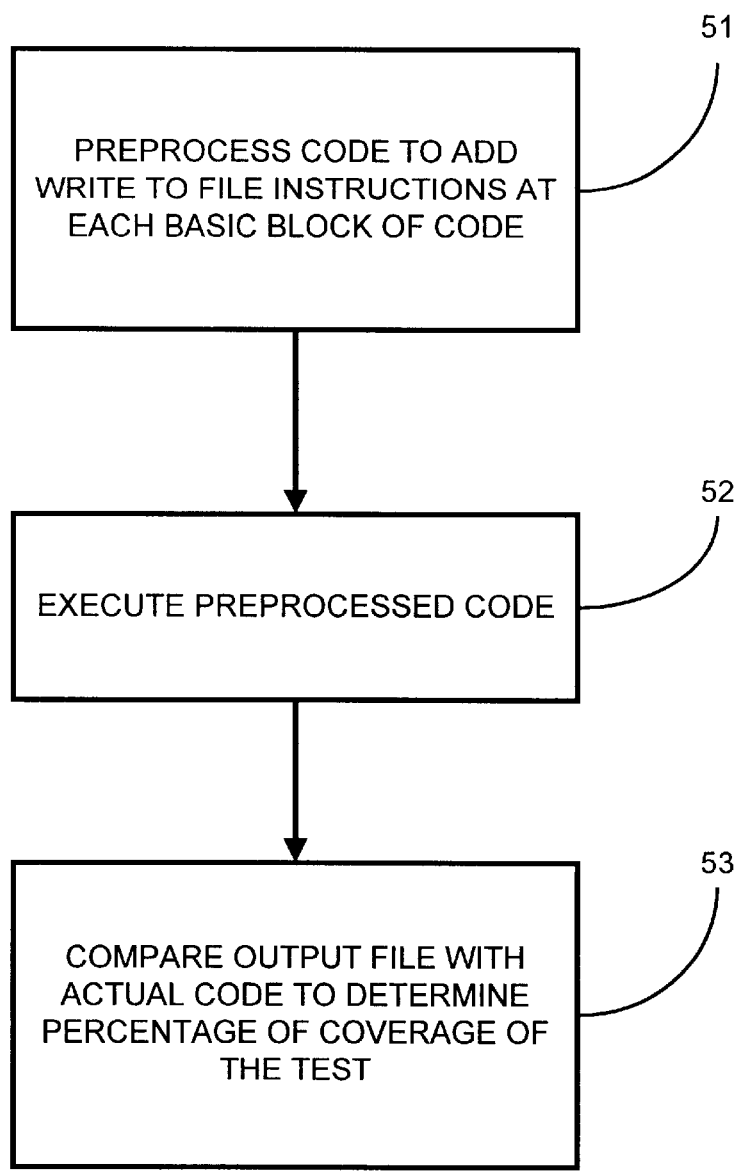
FIG. 2 is a flow chart of a well known prior art method to perform code coverage analysis.

Illustrated in FIG. 2 is the prior art methodology of performing a code coverage analysis. First, the original source code is preprocessed to add a write to file or display instruction at each basic block of code at step 51. This can be very time consuming if performed by the program developer or it may be possible to automate the process by utilizing a special routine to insert the write to file instruction within each basic block of code.

Next, the modified source code is executed at step 52. A comparison is then performed with the output file or display, and the actual program source code to determine a percentages of coverage for the program test at step 53.

As noted above, the write to file or display methods causes increased developer time to insert the write to file or display instructions into the program as well as time required to recompile or reassemble and link the program. The modified program will always runs much slower than the original program as a result of the additional instructions and input/output processing required for each block. There is also a resource requirement of a large amount of disk storage to hold the write to file documentation.

Figure 3:
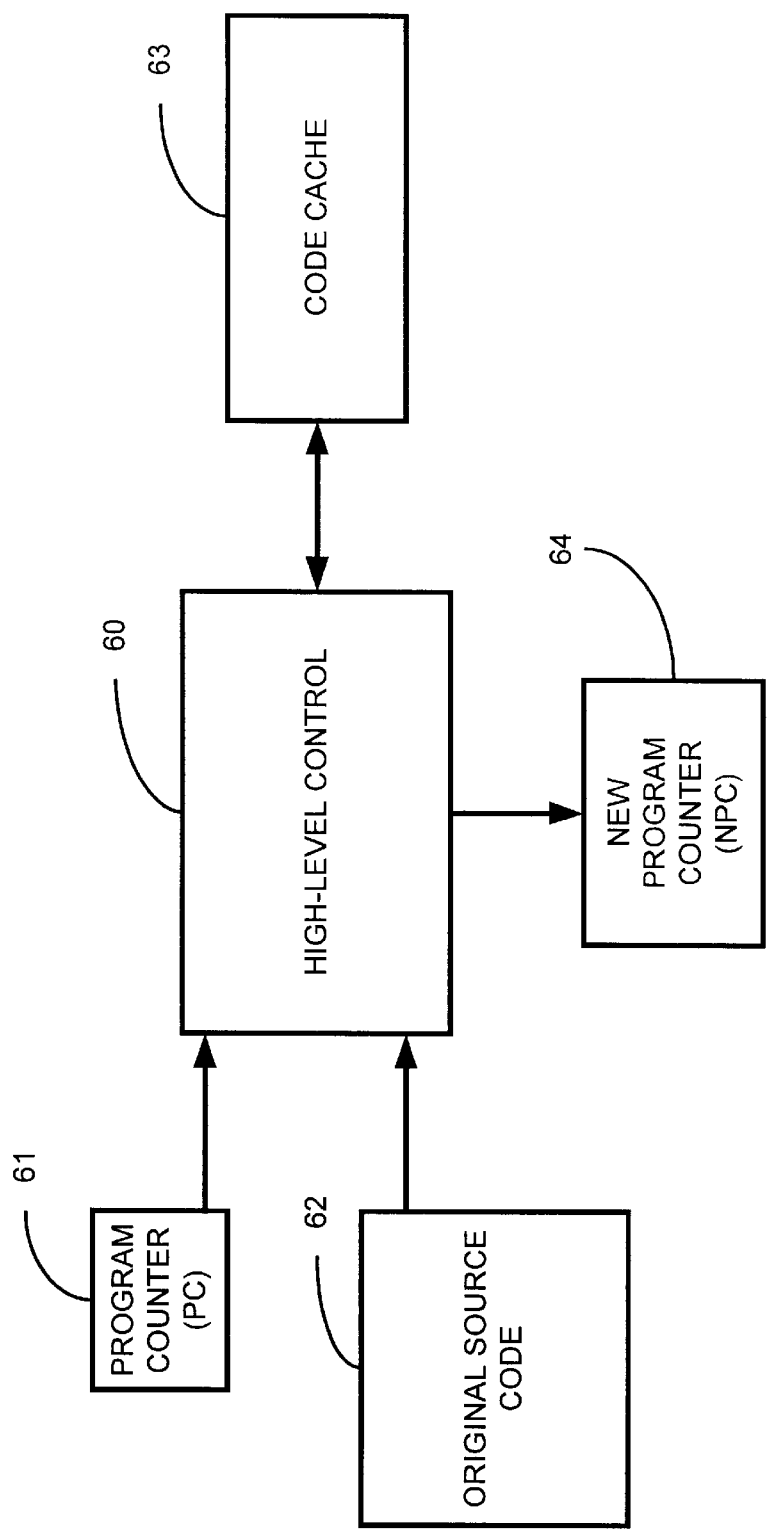
FIG. 3 is a block diagram of the system of the present invention showing the interaction between the program counter, original source code, new program counter, code cache, and the high level control as shown in FIG. 1.

Illustrated in FIG. 3 is a block diagram of the components of the present invention. High level control 60 acquires the address of the next instruction to be executed from the program counter 61. The original source code 62 is provided to the high level control 60, which performs a translation of the original source code 62 and inserts this transformed program code into the code cache 63. A new program counter (NPC) 64 which points to the beginning of the translation is returned for execution. The method of the present invention performed by the high level control is hereinafter explained in detail with regard to FIGS. 4, 5 and 6.

Figure 4:
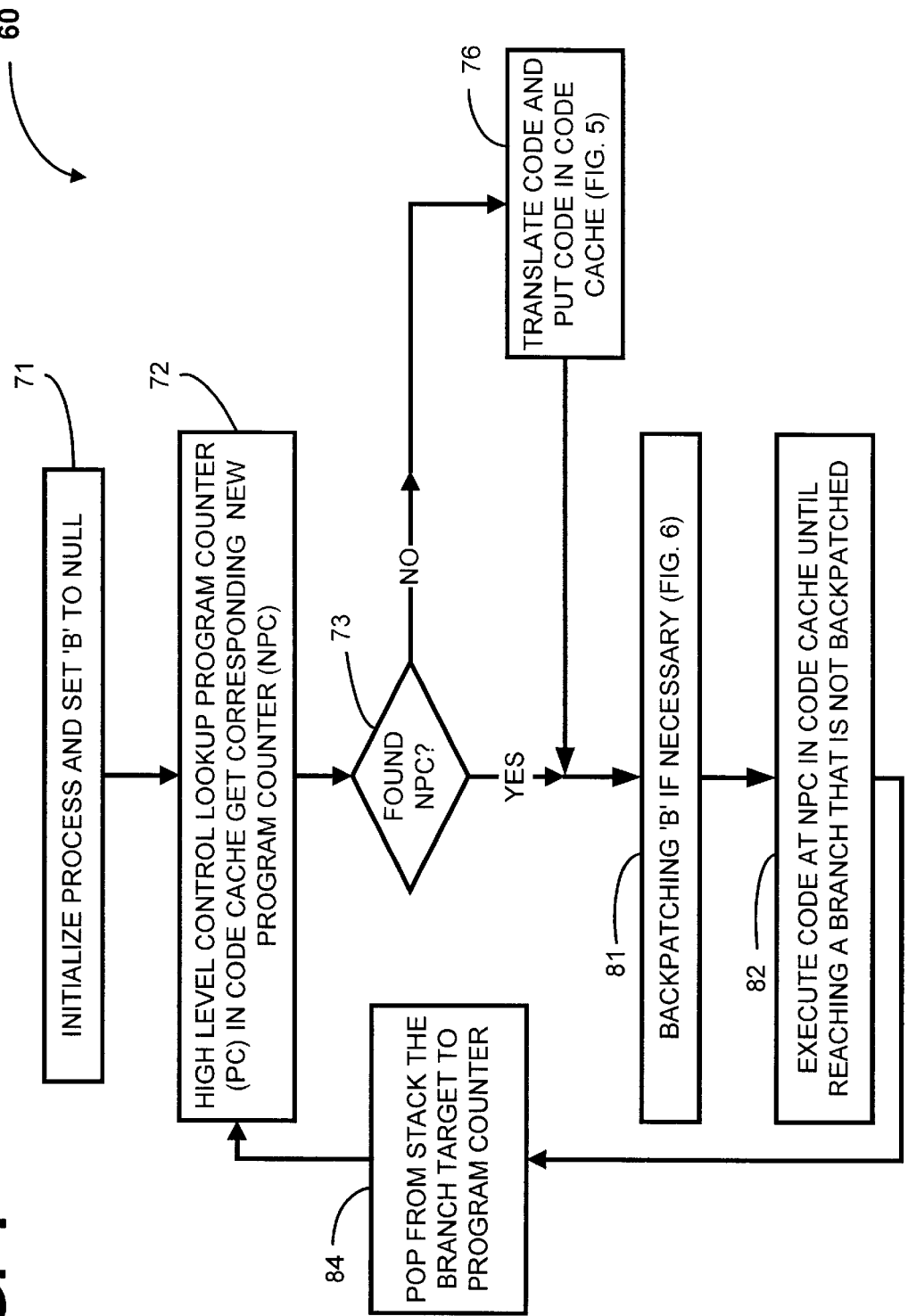
FIG. 4 is a flow chart of the preferred method to perform the fast code coverage analysis within the high level control as shown in FIGS. 1 and 4.

FIG. 4 is a flow chart of the code coverage analysis method of the present invention. First, the high level control 60 process initializes the backpatch pointer "B" to null at step 71. Backpatching is further explained hereinafter. The high level control 60 then performs a lookup of the translation for program counter 61 in the code cache 63 to get a corresponding new program counter 64. If no translation is found in the code cache 63, the high level control 60 translates the original source code 62 and places the translated code into code cache 63 at step 76. The translation of the original source code and placing of the translated code within the code cache is herein further defined with reference to FIG. 5.

If the translation for the program counter 61 is found in the code cache 63 at step 73, the high level control 60 then checks if backpatching the "B" pointer is necessary at step 81. Backpatching involves the process of modifying the destination of a branch address to a different location so that future lookup of the translation for the destination is avoided. The determination of backpatching is herein further defined with reference to FIG. 6.

Next, the high level control 60 allows the execution of the translated code pointed to by the new program counter 64 within the code cache 63 until reaching a branch that is not backpatched at step 82. The high level control 60 next moves the branch target to the program counter 61 at step 84 and returns to step 72 to repeat the process.

Figure 5:
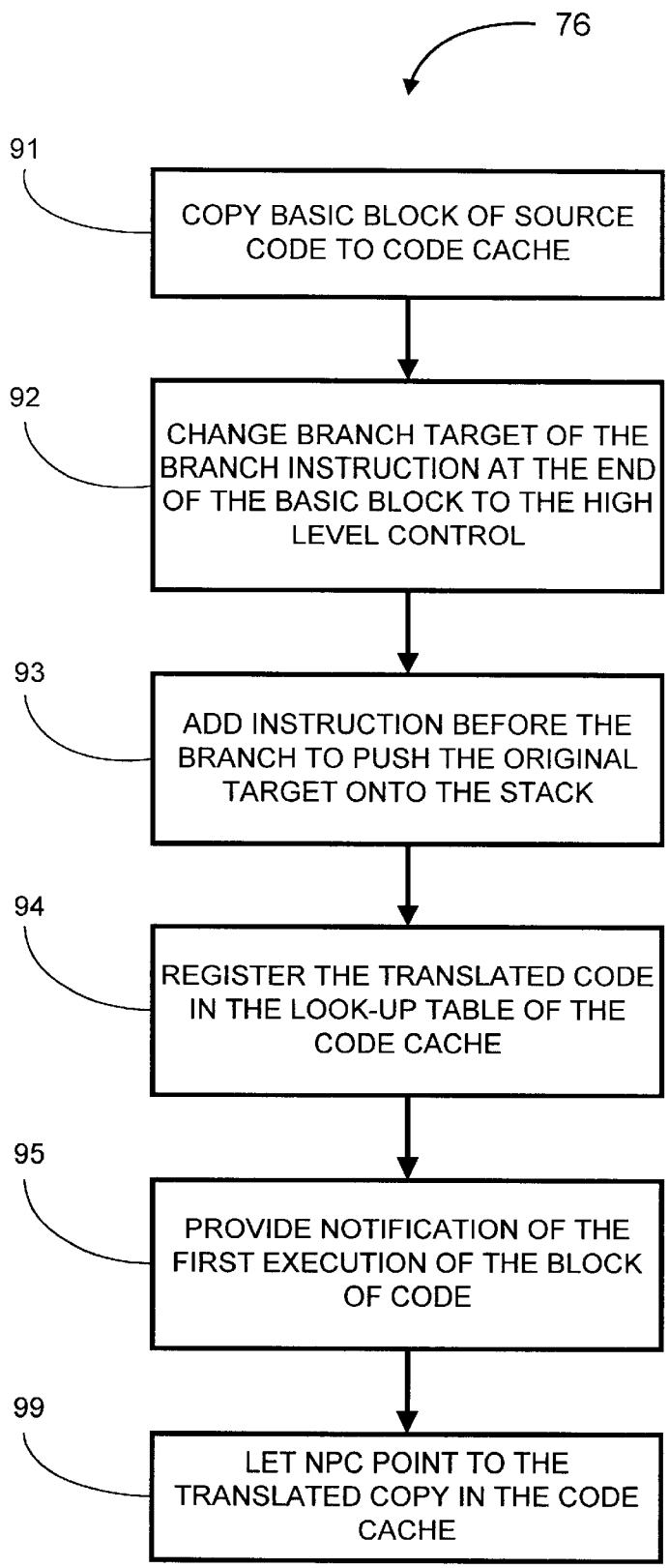
FIG. 5 is a flow chart of the process that translates the program code and puts the program code into the code cache as shown in FIG. 4.

Illustrated in FIG. 5 is the translation of the original source code 62 (step 76 of FIG. 4) and the placing of the translated code into the code cache 63. First, the high level control 60 copies a basic block of the original source code 62 into the code cache 63 at step 91. The high level control 60 changes the branch target address of the branch instruction at the end of the basic block of source code to an address within the high level control 60 at step 92. The high level control 60 adds an instruction before the branch to push the original target address on to the stack at step 93.

Next, the high level control 60 registers the translated code in the code cache's lookup table at step 94, and provides a notification event to mark the first execution of the current block of code at step 95. The notification can be done in the form of writing to a file of the address range or the source line range of the block. This file, which can be called the verification file, can be used in post processing to figure out lines of source code executed.

An alternative approach involves dumping the content of the code cache's lookup table, which has one entry for each executed code block, to the verification file after the program being tested finishes execution. The high level control 60 has the new program counter 64 point to the translated copy of the original source code 62 residing within the code cache 63 at step 99, and returns to step 81 in FIG. 4, for further processing.

Figure 6:
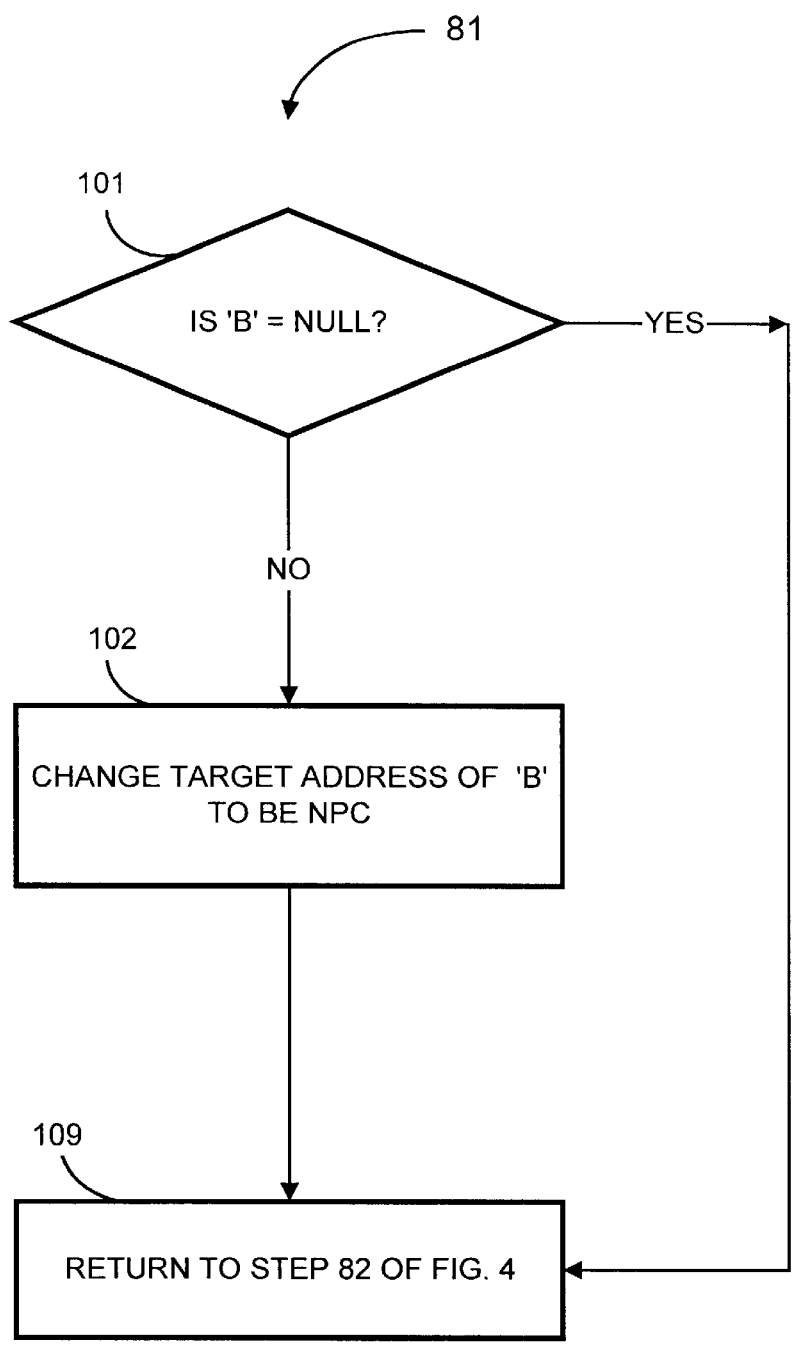
FIG. 6 is a flow chart of the process that determines if a target address within the code cache has been established and some branches can be backpatched.

Illustrated in FIG. 6 is a flow chart of the process for backpatching (81 of FIG. 4) the "B" pointer if necessary. The high level control 60 first tests if the backpatch pointer "B" is equal to null at step 101. If the backpatch pointer "B" is equal to null, the high level control 60 continues the execution of the translated source code by returning to step 82 from step 109.

If the backpatch pointer "B" is not equal to null, then the high level control backpatches the target address of branch "B" to be the address pointed to by the new program counter 64. The backpatch testing process then returns to FIG. 4 at step 82.

FIGS. 7A through 7D show examples of four respective branches and the translated source code for each of the four different types of branch conditions.

Figure 7A:
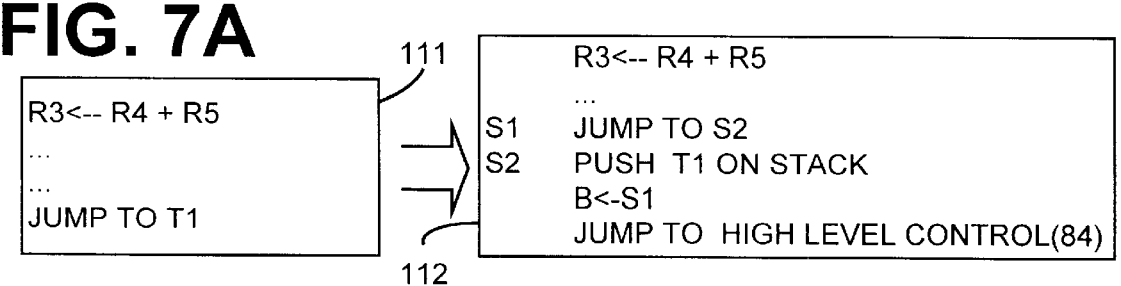
FIG. 7A is a block diagram showing the translation of the original source code to the code that is put in the code cache for a direct unconditional branch.

FIG. 7A shows an example of a translation of a direct unconditional branch. The direct unconditional branch within the original source code 62 is shown to be a jump to the instruction referenced by label T1 at block 111. The jump to the instruction at the address referenced by label T1 in the original source code at block 111 is translated to pushing the address of the instruction referenced by the label T1 onto the stack and jumping to the high level control 60, at step 84 (FIG. 4), in block 112. At method step 84, the stack is popped to reveal the address at label T1, and then the high level control 60 jumps to step 72 (FIG. 4) for continued processing.

Figure 7B:
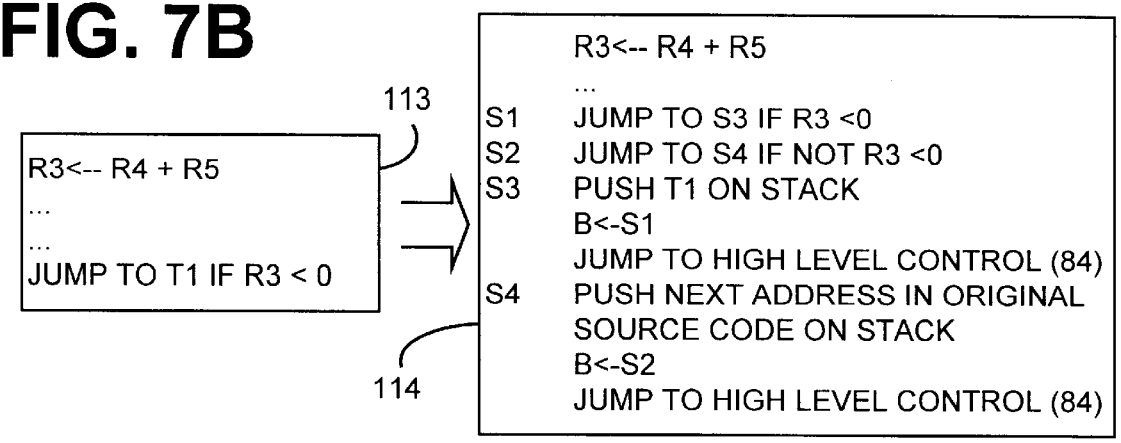
FIG. 7B is a block diagram showing the translation from the original source code to the code put in the code cache for a direct conditional branch.

FIG. 7B shows an example of a translation of a direct conditional branch translation. A direct conditional branch is a jump to an instruction at the address referenced by label T1 if Register 3 is less than zero, such as the instruction within the original source code 62 illustrated in block 113. The translated code in the code cache is shown in block 114. The translated code tests if R3 is less than zero, and if so, the address of the instruction at the address referenced by label T1 is placed on the stack and the method of the program step jumps to the high level control 60, at step 84 (FIG. 4), in block 114. If R3 is not less than zero, then the instruction pushes the address of the next instruction in the original source code on the stack and jumps to the high level control 60, at step 84 (FIG. 4), in block 114. At method step 84, the stack is popped to reveal either the address at label T1 or the fall-through target address, and then the high level control 60 jumps to step 72 (FIG. 4) for continued processing.

Figure 7C:
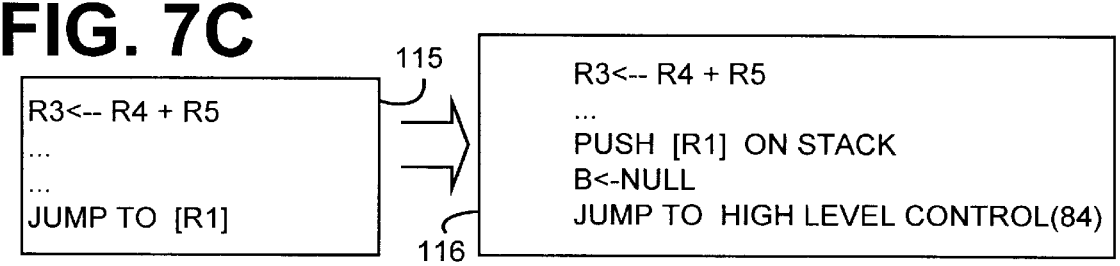
FIG. 7C is a block diagram showing the original program source code and the translated code put into the code cache for an indirect unconditional branch.

FIG. 7C shows an example of a translation of an indirect unconditional branch. Block 115 illustrates a jump to the address pointed to by the contents of Register 1. This indirect unconditional branch is translated to put the address that R1 points to on the stack and jumping to the high level control 60 in block 116. At method step 84, the stack is popped to reveal the address pointed to by R1, and then the high level control 60 jumps to step 72 (FIG. 4) for continued processing.

Figure 7D:
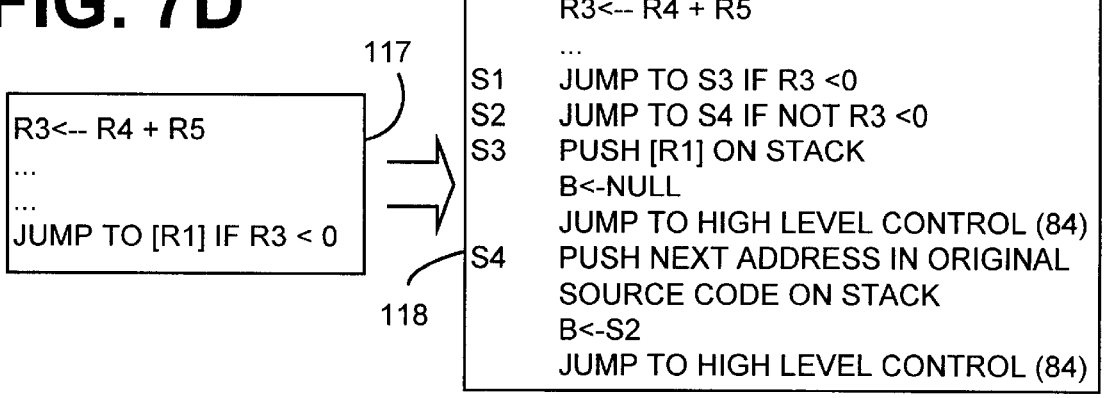
FIG. 7D is a block diagram showing the original source code and translated code placed into the code cache for an indirect conditional branch.

FIG. 7D shows an example of a translation of an indirect conditional branch. Block 117 shows a jump to the address that R1 points to if R3 is less than 0. This code is translated and is reflected in the code displayed in block 118. The code directly translates to the instructions' conditional statement that if R3 is less than zero, then the address that R1 points to is pushed onto the stack and the program then jumps to the high level control 60. If R3 is not less than zero, then the program pushes the address of the next instruction in the original source code onto the stack and then jumps to the high level control 60 in block 118. At method step 84, the stack is popped to reveal the address at label T1 or the fall-through target address, and then the high level control 60 jumps to step 72 (FIG. 4) for continued processing.

Figure 8A:
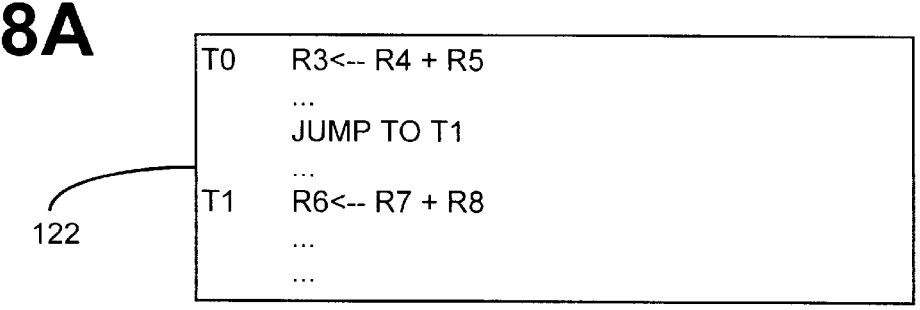
FIG. 8A is a block diagram showing the original source code for an example of a direct, unconditional branch of the present invention.
Figure 8B:
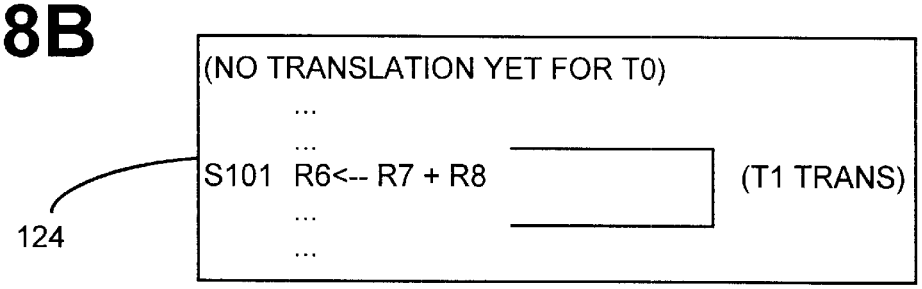
FIG. 8B is a block diagram showing the contents of the code cache of the translation of part of the source code for the example of a direct, unconditional branch as shown in FIG. 8A.
Figure 8C:
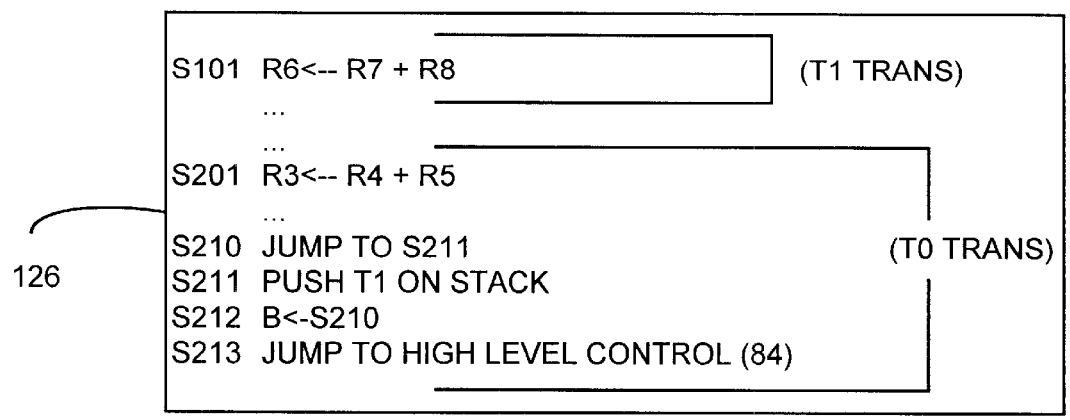
FIG. 8C is a block diagram showing the translated code within the code cache when the translation for the instruction at T0 is added to the code for the example of a direct, unconditional branch as shown in FIG. 8A.
Figure 8D:
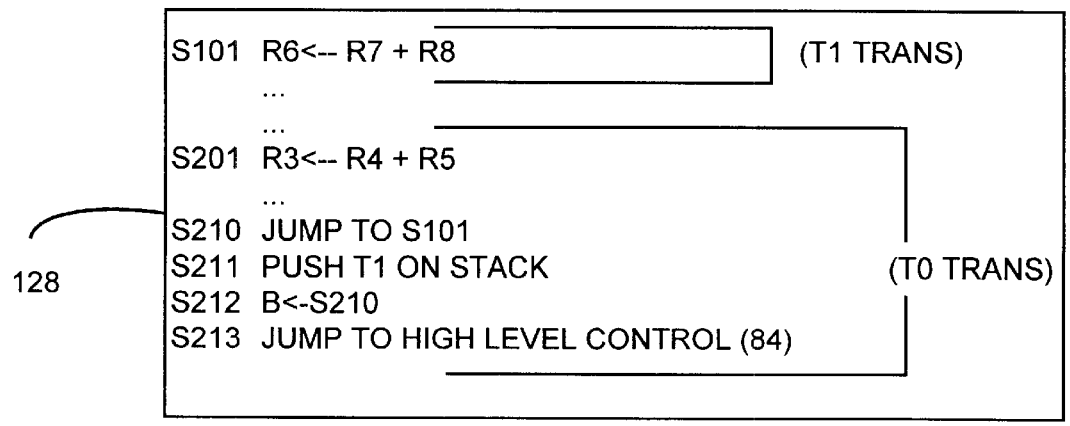
FIG. 8D is a block diagram of the translated original source code within the code cache where a branch is backpatched for the example of a direct, unconditional branch as shown in FIG. 8A.

FIGS. 8A through 8D show an example of a direct unconditional branch. The direct unconditional branch in the original source code is shown in FIG. 8A. How the direct unconditional branch is translated into the code cache is shown in FIG. 8B. The execution of the translated code in the code cache is shown in FIG. 8C. The backpatching within the translated code of the code cache is shown in FIG. 8D.

Illustrated in FIG. 8A is the original source code 122 of an example program for a direct unconditional branch. First, the original source code within the example for the direct unconditional branch in FIG. 8A is translated and placed into the contents of code cache 63 and is illustrated in FIG. 8B.

Illustrated in FIG. 8B is the content of the code cache after the code block T1 of the original source code, for the example program, for a direct unconditional branch in FIG. 8A, is translated 124 and placed into the code cache 63. In this example for direct unconditional branch, it will be assumed that the tested example program is about to execute a statement at line item T0 (i.e., data label T0) of the original source code, therefore the PC 61 points to T0 when executing step 72 of FIG. 4.

At step 72 the lookup table shows that there is no translation for T0 so the process moves to 73 to see if the new program counter is found. Upon finding the new program counter is not being found because there is no translation of the line T0 item in the lookup table, step 76 is executed. Step 76 translates the source code 62 and puts the translated code into the code cache 63 as defined with regard to FIG. 5.

Illustrated in FIG. 8C is the content of the code cache after the code starting at instruction T0 is translated and placed into the code cache 63. This translation causes the addition of the instructions at S201 through S213 as shown in FIG. 8C.

The new program counter 64 is changed to point to the S201 instruction and then the system proceeds with the execution at step 81 in FIG. 4. Then the new program counter 64 is backpatched to the last branch that has T0 as the target at step 81. At step 82, the translated code is pointed to by the new program counter 64 which points to S201 within FIG. 8C and causes the code analysis system to determine that a branch that is not backpatched has been encountered and the program flows to step 84 which is shown as S213 within FIG. 8C.

In step 84, the backpatch pointer "B" points to S210 and the branch targeted by instruction at label T1 is popped from the stack and assigned to the program counter 61. The high level control lookup program 60 counter in the code cache 63 next receives the corresponding new program counter at step 72.

At step 72 the program looks-up the translation for the instruction T1 item and finds the translation at S101 as shown in FIGS. 8B through 8D. The high level control 60 then assigns the address at label T1 to the new program counter 64 and executes the check at step 73. Since the new program counter 64 is found within the code cache 63 at step 73, the high level control 60 proceeds to step 81 to check if backpatching of a branch is necessary.

At step 81 the high level control 60 backpatches the branch pointed to by backpatch pointer "B", which is in this example is S210, using the new program counter 64 which points to S101. Now the code cache has the contents as shown in FIG. 8D. Note the change at label location S210 between FIGS. 8C and 8D. The changes at label location S210, include changing the jump location from S211, which in the original unexecuted translated code, to now jump to the instruction location pointed to by S101, since the code block at S101 has been executed at least once.

At step 82 in FIG. 4 the high level control 60 executes the program pointed to by the new program counter 64 which points to S101 and continues to loop through the code. From now on, every time the high level control 60 executes the translation for T0 at S201, the executed test program jumps to instruction location pointed to by S101 at S210 without the need of a lookup for data label T1.

Illustrated in FIG. 9A is an example program 132 of the original source code 62, including an indirect conditional branch, and in FIG. 9B is the translated source code as a content of the code cache 63. In the code cache is a translation of the instruction label T1 at S101 and a translation of label T2 at S201. Within an example of a tested program that is about to execute the statement at label T0, and therefore the program counter 61 points to the data label T0 during execution of step 72 in FIG. 4.

At step 72 in FIG. 4, the lookup table shows no translation for the label T0. Since the data label T0 is not found in the new program counter 64, the high level control 60 determines that this is the first time this new block of code has been executed, and moves to step 76 to translate the new block of code. The translated new block of code is written into the code cache as defined in detail with regard to FIG. 5.

Illustrated in FIG. 9C, is the high level control 60 translation of the block of code starting with the label T0. After translation the high level control 60 puts in the instruction translation at labels S301 to S317 at step 76. The high level control 60 also changes the new program counter 64 to point to the label S301 and then moves to step 81 to decide if backpatching is necessary. The new program counter 64 is backpatched to the last branch instruction that has T0 as the target address at step 81. At step 82, the high level control 60 executes the block of code pointed to by the new program counter 64 which points to label S301.

During the execution of the next block of code, the example program encounters an indirect conditional branch and must determine if R3 is less than zero at label S310. For purposes of this example, it will be assumed that R3 is not less than zero and the high level control 60 falls through to the instruction at S311. The high level control 60 then jumps from label S311 to the instruction at S315, because R3 is greater than or equal to zero. The instruction at S315 pushes the address pointed to by the label T1, the fall-through target address, onto the stack and proceed to assign the address S311 to backpatch pointer "B" and jump to step 84 of FIG. 4, as shown in step S315 of FIG. 9C.

At this point, the backpatch pointer "B" points to address S311 and the high level control 60 pops the branch target from the stack into the program counter 61. The high level control next executes step 72 which causes a lookup of the translation for label T1 and finds the translation at address S101. The high level control 60 then assigns label T1 to the new program counter 64, and the processing proceeds to step 81 of FIG. 4. At step 81, the high level control 60 backpatches the branch pointed to by the backpatch "B" pointer which contains the pointer to S311 using the new program counter which points to the instruction at S101. At this point, the code cache now has the contents shown in FIG. 9D.

Note the change of the jump destination at instruction S311 between FIGS. 9C and 9D. While executing at step 82, the high level control 60 executes code pointed to by the new program counter 64 at address S101 and proceeds as before. At this point in the example, every time the code analysis executes the translation for label T0 at address S301 and if R3 is not less than zero, the program jumps to address S101 from address S311 without the need of a lookup of label T1. If on the other hand, R3 is less than zero at instruction at address S310 and R1 points to T2, the high level control 60 will not backpatch address S310 even though the code lookup has a translation for T2 at address S201. This is because the contents of R1 can be changed every time the execution processes the address at address S312.

The fast code coverage analysis program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings.

The embodiment or embodiments discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method to analyze a computer program, having a plurality of blocks of code, the method comprising the steps of:

executing each of said plurality of blocks of code;

determining if each of said plurality of blocks of code is executing for the first time by looking up each of said plurality of blocks, which are executing, in a code cache;

providing a notification when each block of said plurality of blocks of code is executing for the first time, where the providing step further comprises translating said block;

storing a translated block in said code cache; and copying a range of addresses corresponding to said block of code to a verification file.

2. The method of claim 1, where the providing a notification step further comprises the step of:

skipping the providing of a notification when executing any of said plurality of blocks of code for other than the first time.

3. The method of claim 1, further comprising the steps of:

determining the number of blocks of code executed during executing of said plurality of blocks of code;

determining the number of blocks of code in said computer program; and calculating the percentage of said blocks of code executed out of said blocks of code in said computer program.

4. A code analysis apparatus for analyzing a computer program, having a plurality of blocks of code, said code analysis apparatus comprising:

means for executing each of said plurality of blocks of code;

means for determining if each of said plurality of blocks of code is executing for the first time by looking up each of said plurality of blocks, Which are executing, in a code cache;

means for providing a notification when each block of said plurality of blocks of code is executing for the first time, where the means for providing further comprises means for translating said block;

means for storing a translated block in said code cache; and means for copying a range of addresses corresponding to said block of code to a verification file.

5. The apparatus of claim 4, where the means for providing a notification further comprises:

means for skipping the providing of a notification when executing any of said plurality of blocks of code for other than the first time.

6. The apparatus of claim 4, further comprising:

means for determining the number of blocks of code executed during executing of said plurality of blocks of code;

means for determining the number of blocks of code in said computer program; and means for calculating the percentage of said blocks of code executed out of said blocks of code in said computer program.

7. A computer readable medium having a program for analyzing a computer program, having a plurality of blocks of code, said program comprising:

a logic configured to control the execution each of said plurality of blocks of code;

a logic configured to determine if each of said plurality of blocks of code is executing for the first time by looking up each of said plurality of blocks, which are executing, in a code cache;

a logic configured to provide a notification when each block of said plurality of blocks of code is executing for the first time, where the logic configured to provide a notification comprises a logic configured to translate said block;

a logic configured to store a translated block in said code cache; and a logic configured to copy a range of addresses corresponding to said block of code to a verification file.

8. The computer readable medium of claim 7, where the logic configured to provide a notification further comprises:

a logic configured to skip providing a notification when executing any of said plurality of blocks of code for other than the first time.

9. The computer readable medium of claim 7, further comprising:

a logic configured to determine the number of blocks of code executed during executing of said plurality of blocks of code;

a logic configured to determine the number of blocks of code in said computer program; and a logic configured to calculate the percentage of said blocks of code executed out of said blocks of code in said computer program.

10. A code analysis apparatus for analyzing a computer program, having a plurality of blocks of code, said code analysis apparatus comprising:

a code cache for holding said plurality of blocks of code; and a high level control for executing each of said plurality of blocks of code, wherein said high level control further determines when each of said plurality of blocks of code is executing for the first time by looking up each block in said code cache, wherein said high level control further provides notification when each of said plurality of blocks of code is executing for the first time by translating said block and storing a translated block in said code cache, and wherein said high level control further provides notification when each of said plurality of blocks of code is executing for the first time by copying a range of addresses corresponding to said block of code to a verification file.

11. The apparatus of claim 10, wherein the high level control configured to provide a notification further comprises:

a logic configured to skip providing a notification when executing any of said plurality of blocks of code for other than the first time.

12. The apparatus of claim 10, further comprising:

a logic configured to determine the number of blocks of code executed during executing of said plurality of blocks of code;

a logic configured to determine the number of blocks of code in said computer program; and a logic configured to calculate the percentage of said blocks of code executed out of said blocks of code in said computer program.

* * * * *